United States Patent [19]

Stoner et al.

[11] Patent Number: 5,416,770
[45] Date of Patent: May 16, 1995

[54] METHOD AND APPARATUS FOR ESTABLISHING DISPATCH AUDIO COMMUNICATION IN A COMMUNICATION SYSTEM

[75] Inventors: John E. Stoner, Downers Grove; Kenneth J. Wollack, Itasca, both of Ill.

[73] Assignee: Motorola, Inc., Schaumburg, Ill.

[21] Appl. No.: 121,818

[22] Filed: Sep. 15, 1993

[51] Int. Cl.⁶ .................. H04B 7/14; H04B 7/26; H04Q 7/00
[52] U.S. Cl. .................................. 370/60; 370/61; 370/94.1; 370/95.1; 379/58; 379/87; 455/56.1
[58] Field of Search .................. 370/58.1, 58.2, 58.3, 370/60, 61, 85.7, 94.1, 94.2, 95.1, 95.3; 379/58, 59, 63, 67, 88, 93, 94; 455/34.1, 34.2, 53.1, 54.1, 54.2, 56.1, 57.1, 58.2, 3.1, 5.1

[56] References Cited

U.S. PATENT DOCUMENTS

| | | | |
|---|---|---|---|
| 4,734,907 | 3/1988 | Turner | 370/60 |
| 5,070,499 | 12/1991 | Maher et al. | 370/61 |
| 5,200,954 | 4/1993 | Teel, Jr. et al. | 370/94.1 |
| 5,276,442 | 1/1994 | Cree et al. | 370/85.7 |
| 5,282,204 | 1/1994 | Shpancer et al. | 370/94.2 |
| 5,287,354 | 2/1994 | Teel, Jr. et al. | 370/85.7 |
| 5,305,308 | 4/1994 | English et al. | 370/94.2 |

*Primary Examiner*—Alpus Hsu
*Attorney, Agent, or Firm*—James A. Coffing; Nedra D. Karim

[57] ABSTRACT

Audio communication may be established between a plurality of communication units in a communication system that includes a dispatch switching center in the following manner. A first communication unit generates information to be distributed to a second communication unit. The dispatch switching center receives a digital packet including the information to be distributed, and ascertains an identifier associated with the second communication unit. The dispatch switching center replicates the information to be distributed, and uses the identifier to distribute the replicated information to the second communication unit.

16 Claims, 2 Drawing Sheets

METHOD AND APPARATUS FOR ESTABLISHING DISPATCH AUDIO COMMUNICATION IN A COMMUNICATION SYSTEM

FIELD OF THE INVENTION

This invention relates generally to communication systems and, in particular, to establishing audio communication between communication units geographically located within such a system.

BACKGROUND OF THE INVENTION

Wide area dispatch systems are well known in the art for providing simultaneous communications to a large number of mobile, geographically distributed users. Prior art wide area systems are typically composed of multiple geographically distributed radio sites connected to a master location, via point-to-point dedicated telecommunications circuits. At call initiation, or setup, a dedicated communications path is assigned to each radio site that is to participate in the call (i.e., sites whose coverage area services the target communication units). Further, a dedicated voice bridge, located at the master location, is assigned to the call. Upon receipt of the inbound audio from the initiating communication unit, the receiving radio site transfers the voice on to the dedicated communications circuit. The central site presents the voice to the voice bridge, which in turn produces multiple copies of the voice, one for each target or receiving radio site.

The foregoing system, while perhaps generally solving the problem of dispatch audio, is inherently inefficient due to the dedication of a communications circuit and a voice bridge for each call. That is, a significant portion of the communications infrastructure remains idle while a call is being assigned. As an example, while the speaker pauses during the call (e.g., as between two sentences or thoughts), the communications facilities remain dedicated to the call, while no information is being transferred. In particular, the expensive communications facilities (e.g., a dedicated 64 kbps circuit) is not shared among multiple users while the facility is assigned to a call, since the switching infrastructure differentiates calls on the basis of assigned communications facilities. Accordingly, this results in the systematic duplication of costly communications infrastructure to support a greater number of calls.

One attempt to solve the problem has been to digitize the voice into discrete packets, and switch the discrete packets using an X.25 packet switch. However, this solution is feasible only for systems that deliver data only (e.g., to/from computers, printers and routers), and not voice. That is, these devices typically require that the information be received error free, while tolerating rather large delays (e.g., in the range of seconds) as well as significant variance between delays among sequential packets (e.g., one packet received 500 milliseconds late, and the next packet received 100 milliseconds late). In particular, an X.25 switch, upon detection of a corrupted message, typically discards the entire message and requests that a second copy of the message be sent, thus preserving the integrity of the message at the expense of additional delay. (It should be noted that, statistically speaking, not all messages are corrupted. Thus, the observed message delivery delay varies depending on the number of transmissions required to successfully deliver the message to the intended destination.) Of course, in a voice-capable system, it would be impractical to require the speaker to re-send the corrupted voice message. Likewise, it would be unacceptable to have delays of this order in a voice message.

Voice, in stark contrast to data, imposes different requirements upon the transmission facilities. That is, an ideal transmission of a voice message would forego message integrity to provide tighter delay parameters. Unlike a data-oriented computer system, humans are well adapted at "filling-in" any missing gaps of audio. That is, the listener need not hear every syllable of every word in a message correctly to derive the information intended to be communicated by the speaker. It is only important that the syllables of the message be timely delivered in a consistent manner, so the listener can "fill-in" the gaps formed when one of the syllables is incorrectly transmitted (i.e., after modulation). In short, a voice message may be usable if delivered with a small percentage of the information lost and slightly delayed, but is far less usable when delivered with a significant variance in the message delivery delay. That is, the integrity of voice—while preserved in terms of content—is destroyed by the high statistical inter-message delay associated with the X.25 communications facility. Furthermore, an X.25 switch does not provide the ability for dynamic reconfiguration of services that are needed to replace the voice bridge. Likewise, conventional frame relay is inadequate, as it fails to provide a platfom, for reliable, concurrent transmission of voice and data (e.g., control data).

Accordingly, a need exists for a method and an apparatus to establish audio communication between communication units in a wide area system that is not constrained by the shortcomings found in the prior art. In particular, a voice communication system that minimizes the magnitude and variance of inter-message delay, while making efficient use of the costly infrastructure, would be an improvement over the prior art.

DESCRIPTION OF A PREFERRED EMBODIMENT

Generally, the present invention provides a means and a method for establishing audio communication between a plurality of communication units in a communication system. When a communication unit in one site initiates a communication with at least one other communication unit in another site, the audio information to be communicated is sent to a dispatch switching center, via frame relay links. The dispatch switching center then identifies the target communication units, and the site with which these units are presently affiliated. For each target communication unit that is identified, a replica of the audio information is created. The replica is then distributed, via the frame relay links, to each site affiliated with an identified target communication unit. (It should be noted that by using frame relay links, audio data packets can be transported asynchronously onto a frame relay network, and later resynchronized before being transmitted to the target communication units. This operation allows communication units affiliated with different sites to communicate in a manner substantially more efficient than prior art systems.)

Figure 1:
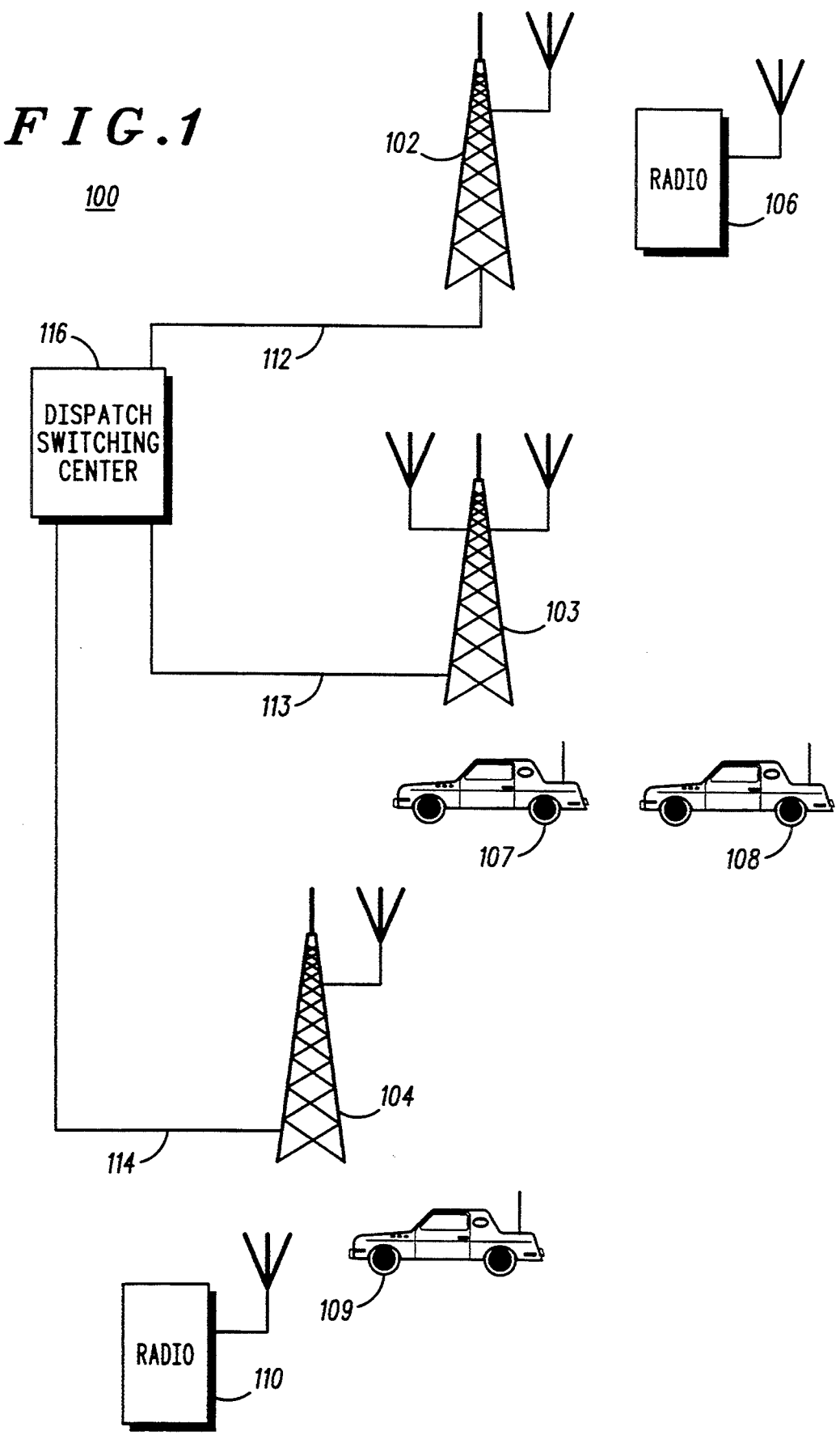
FIG. 1 illustrates a wide area communication system, in accordance with the present invention.

The present invention can be more fully described with reference to FIGS. 1–3. FIG. 1 illustrates a wide area communication system (100) that includes communication sites (102–104), a plurality of communication units (106–110), frame relay links (112–114), and a dispatch switching center (116). The communication sites (102–104) may be various types of radio frequency (RF) base station sites. Sites 102 and 104 represent single frequency/antenna sites while site 103 represents a multi-frequency/antenna site. The communication units (106–110) may be, for example, portable radios (106, 110), or mobile radios (107–109). Further, the communication units (106–110), and the base station sites (102–104) may be components of a typical MIRS (Motorola Integrated Radio System) communication installation.

Base stations (102–104) generally support two types of physical interfaces. The first type is a land-line based, single channel, low speed, digital interface to the frame relay links (112–114). (It should be noted that frame relay is a generic term given to a simplified packet switching technology.) The physical protocol of this interface is typically V.35, but can typically be any format that supports 64 kbps or higher. Voice and control services are supported in packet data form, which packets are transmitted and received asynchronously. A second type of interface—commonly referred to as a point-to-multi-point, digital time division multiplex (TDM) RF interface—supports the datalinks to the communication units (106–110). As in the first interface, voice and control services are supported in packet data form. Further, multiple communication units share one or more control channels, while traffic (e.g., voice) channels are assigned on a transient basis for the duration of a call. (It should be noted that a base station (e.g., 103) additionally provides a protocol/interface conversion from the land-line interface to the RF interface. That is, voice arriving asynchronously from a land-line must be correctly ordered and sent out synchronously in the appropriate TDM slot to the target communication unit(s). By contrast, the communication units (106–110) support the digital TDM RF interface directly.)

As earlier mentioned, the frame relay links (112–114) are single channel, low speed digital links. Typical speeds range from 64 kbps–192 kbps. In a preferred embodiment, the frame relay links (112–114) carry traffic in accordance with a frame relay protocol, and bandwidth is allocated on an as-needed basis. These links can be thought of as a single pipeline, through which voice data packets are conveyed asynchronously to the base stations. Also in a preferred embodiment, voice packets are stamped with a sequential identifier, which is used to synchronize the packets for transmission on an outbound (i.e., from base station-to-mobile) TDM carrier.

While asynchronous transmission of voice data generally increases efficiency, control data flowing asynchronously through the system usually creates gaps in the voice stream. That is, if control data causes a gap in time (e.g.., the last portion of the control message is delayed), one or more voice packets will be late arriving at the target base stations. Since the voice is designed to be a synchronous stream outgoing to the communication units, packets arriving late for specific slots can not be sent and must be discarded. Accordingly, control gaps must be limited to provide the advantages of asynchronous flow of both control and voice data. In a preferred embodiment, this is accomplished in two ways:

1) limiting packet size; and
2) flow control.

Control data is sized appropriately to avoid undesired processing overhead, and a windowing mechanism is used to provide flow control. In a preferred embodiment, the present invention limits control packet size to approximately the same size as voice data packets. A sequencing protocol overlays the control protocol to segment logical control data messages into one or more packet data units (PDU). In a preferred embodiment, the PDU carries a logical message number and the segment number, allowing for re-assembly of the control message at the receiving end (e.g., the dispatch switching center, communication sites). (It should be noted that this is a so-called end-to-end protocol, and the frame relay interfaced packet device, as later described, does not need to recognize this protocol.) In a preferred embodiment, flow control is accomplished using a sliding window mechanism. That is, the rate of introduction of the segmented PDU's into the frame relay pipeline is governed so as to maintain a limited number of outstanding PDU's (i.e., yet to be acknowledged) in the system at any one time. In a preferred embodiment, a window of size one (i.e., one PDU) is maintained, allowing only a single packet to be outstanding. While the foregoing process imparts a minimal delay in the flow of control data—resulting in imperceptible delays in voice—it allows for the reliable coexistence of voice and control data.

Figure 2:
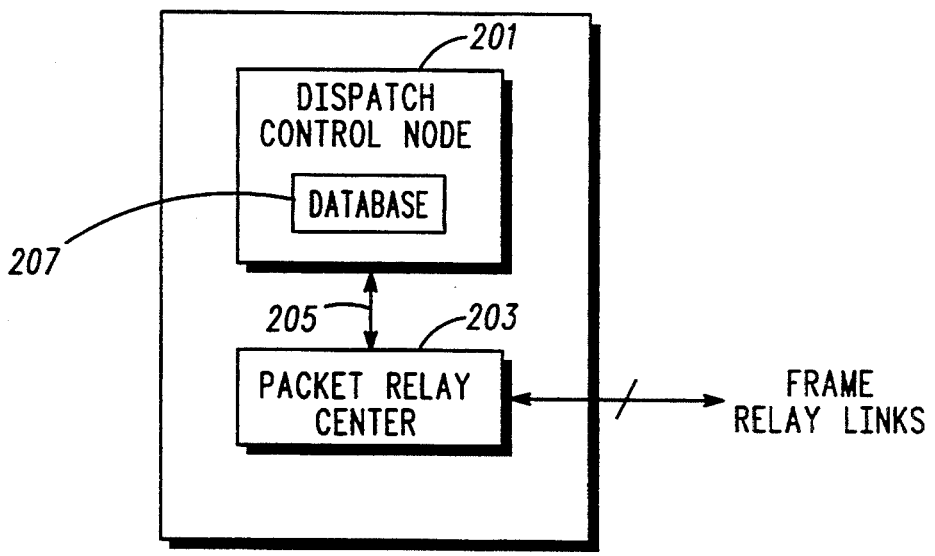
FIG. 2 illustrates the dispatch switching center, in accordance with the present invention.

FIG. 2 illustrates the dispatch switching center (116) that includes a dispatch control node (201), a packet relay center (203), communication link (205), and database (207). In a preferred embodiment, the dispatch control node (201) is the central facility for call processing, and is responsible for maintaining the database (207) that contains present location of individual communication units. (It should be noted that location for a particular communication unit is defined as the base station (i.e., control channel) that the unit is currently affiliated with.) Generally, the dispatch control node (201) receives call requests from the communication units (106–110), and processes them upon priority and resource considerations, as next described.

To illustrate the present invention, consideration is given to a dispatch call requested by an individual communication unit. The request is typically a simplex call to either a single target communication unit, or to two or more communication units. (Note that when the transaction is to two or more subscriber units, it is referred to as a group dispatch call. The group is identified by a group designator, and each communication unit may belong to one or more groups concurrently.) The dispatch control node (201) then informs all target communication units of the pending call, and alerts the originating communication unit that the request has been accepted. The dispatch control node (201) then allocates a single transaction number that is used throughout the call to uniquely identify the call. In a preferred embodiment, the transaction number is an integer value within a predetermined range, and are sequentially assigned from a list of available transaction numbers. The dispatch control node (201) then sends a pending call indication to those base stations having communication units in the specified group. A logical message is generated for each target base station and segmented into one or more PDUs, as earlier described. Each PDU is addressed with a frame relay address of the target base station, and encapsulated into frame relay frames. These frames are then sent to the packet relay center (203), via the communication link (205). Individual base stations allocate traffic channels for the pending call to be disseminated to the group members.

Figure 3:
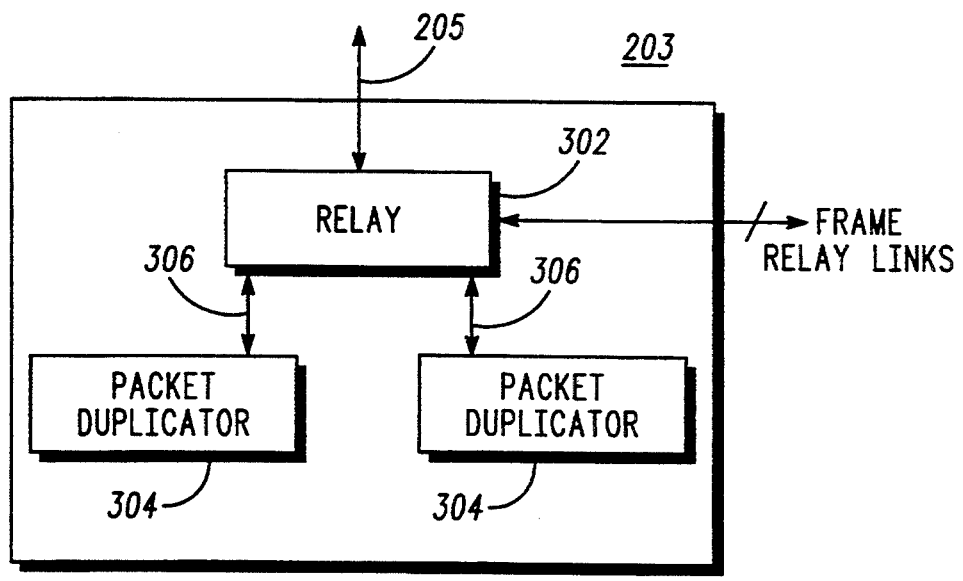
FIG. 3 illustrates a packet relay center, in accordance with the present invention.

FIG. 3 illustrates the packet relay center (203) that includes at least one frame relay interfaced packet relaying devices (e.g., relay 302), packet duplicators (304), and communication links (306). Note that although only two are shown, the packet relay center (203) preferably supports many packet duplicators (304). The packet duplicators (304) are supervised by the dispatch control node (201), which in turn coordinates call processing for the users. The packet duplicator (304) supports both control and voice services.

To describe the functionality of the packet duplicators (304), consideration is again given to the exemplary dispatch group call described above. As earlier mentioned, a preferred network is capable of supporting multiple packet duplicators (304). The dispatch load of such a network is distributed substantially evenly across the plurality of available packet duplicators (304). The dispatch control node (201) selects a packet duplicator, from a list of available duplicators, by determining which packet duplicator has the lightest load. In a preferred embodiment, this determination is made through the comparison of packet duplicator loading factors, which factors take into account the number of ongoing calls and number of target base stations (i.e., those base stations affiliated with target communication units) participating in each call. The dispatch control node (201) then advises the selected packet duplicator of the frame relay address for each of the target base stations, as well the transaction number corresponding to the call. Likewise, the dispatch control node (201) alerts the originating communication unit's base station of the specific packet duplicator chosen for the call, and the transaction number to ensure that the pending voice packets will have the correct frame relay address.

In a preferred embodiment, the originating communication unit transmits encoded packet voice on the channel chosen by the originator's base station, as earlier described. The encoded packet voice arrives in the appropriate slots of the TDM RF carriers, and each packet is sequentially identified, to facilitate the decoding process. The base station then collects the voice packet, and stamps it with the transaction number and frame relay address of the selected packet duplicator. This modified packet is then sent to the packet relay center (203), where it is routed to the proper packet duplicator (304).

Upon receipt of the packet, the packet duplicator (304) creates a replica of the voice data for each target base station, as determined from the unique transaction number, to produce a message replica. Each message replica is then combined with at least the transaction number to produce a distributable digital information packet. The distributable information packet is then assigned the appropriate frame relay address and forwarded to the frame relaying mechanism, where it is routed to the base station corresponding to that address. The base station then identifies the time slot on the TDM traffic channel that is allocated for that call. The asynchronous stream of packets is then re-synchronized for transmission on the outgoing time slot, and the target communication unit subsequently receives and decodes the originator's voice message.

Accordingly, the present invention provides a means and method for establishing frame relay dispatch audio communication between a plurality of communication units in a communication system. By replicating each packet, and distributing the replicated packet to the target communication units, reliable audio communication is established between a plurality of communication units.

What is claimed is:

1. In a two-way radio communication system, a method of establishing packet-switched audio communication between a plurality of communication units in the communication system, the method comprising the steps of:
   a) generating, from a first of the plurality of communication units, a digital packet that includes information to be distributed to at least a second of the plurality of communication units;
   at a dispatch switching center;
   b) receiving the digital packet that includes an information portion that is representative of the information to be distributed;
   c) ascertaining an identifier associated with at least the second of the plurality of communication units, and identifying at least one target base station required to establish the audio communication:
   d) replicating for each of the target base stations identified, the information portion to produce a message replica; and
   e) using the identifier to provide asynchronous distribution of the message replica to at least the target base station, such that audio communication is established between the first communication unit and at least the second communication unit.

2. The method of claim 1, wherein step (c) comprises the steps of:
   c1) receiving, from the first communication unit, a group ID; and
   c2) using the group ID to retrieve the identifier from a database coupled to the dispatch switching center.

3. The method of claim 1, wherein step (c) comprises the step of receiving, from the first communication unit, the identifier.

4. The method of claim 1, wherein step (e) comprises the steps of:
   e1) combining at least one of the plurality of replicas with a transaction number that is based, at least in part, on the ascertained identifier to produce a distributable digital packet; and
   e2) distributing the distributable digital packet to at least the second communication unit.

5. The method of claim 1, wherein step (b) comprises the step of receiving the digital packet asynchronously, via a frame relay link.

6. The method of claim 5, wherein the communication system includes a plurality of communication sites, and wherein step (e) comprises the step of synchronously transmitting, from at least one of the plurality of communication sites, at least a first of the plurality of replicas to at least the second communication unit, via a TDM time slot.

7. The method of claim 1, wherein the communication system includes a plurality of communication sites, and wherein step (e) comprises the step of synchronously transmitting, from at least one of the plurality of communication sites, at least a first of the plurality of replicas to at least the second communication unit, via a TDM time slot.

8. In a two-way radio communication system, a method of establishing packet-switched audio communication between a plurality of communication units in the communication system, the method comprising the steps of:
   a) generating, from a first of the plurality of communication units, a digital packet that includes information to be distributed to at least a second of the plurality of communication units;
   at a dispatch switching center;
   b) receiving the digital packet that includes an information portion that is representative of the information to be distributed;
   c) receiving, from the first communication unit, a group ID, and identifying at least one target base station required to establish the audio communication;
   d) using the group ID to retrieve an identifier associated with at least the second of the plurality of communication units from a database coupled to the dispatch switching center;
   e) replicating, for each of the target base stations identified the information portion to produce a message replica; and
   f) using the identifier to provide asynchronous distribution of the message replica to at least the target base station, so as to establish audio communication between the first communication unit and at least the second communication unit.

9. The method of claim 8, wherein step (f) comprises the steps of:
   f1) combining at least one of the plurality of replicas with a transaction number that is based, at least in part, on the identifier to produce a distributable digital packet; and
   f2) distributing the distributable digital packet to at least the second communication unit.

10. The method of claim 8, wherein step (b) comprises the step of receiving the digital packet asynchronously, via a frame relay link.

11. The method of claim 10, wherein the communication system includes a plurality of communication sites, and wherein step (e) comprises the step of synchronously transmitting, from at least one of the plurality of communication sites, at least a first of the plurality of replicas to at least the second communication unit, via a TDM time slot.

12. The method of claim 8, wherein the communication system includes a plurality of communication sites, and wherein step (e) comprises the step of synchronously transmitting, from at least one of the plurality of communication sites, at least a first of the plurality of replicas to at least the second communication unit, via a TDM time slot.

13. A packet relay center for providing frame relay packet switching of asynchronous voice information between a plurality of communication units in a two-way radio communication system, the packet relay center comprising:
   a plurality of packet duplicators wherein a predetermined one of the plurality of packet duplicators is used to duplicate a dispatch message originating from a first of the plurality of communication units to produce at least a first message replica; and
   combining means for combining a unique transaction number corresponding to the dispatch message with the at least a first message replica to produce at least one distributable information packet, wherein the unique transaction number uniquely identifies the dispatch message for later use by a target base station associated with at least a second of the plurality of communication units.

14. The packet relay center of claim 13, further comprising a plurality of frame relay links, operably coupled to the combining means, for distributing the distributable information packet to at least the second communication unit.

15. A dispatch switching center for asynchronously distributing a dispatch message, via a plurality of base stations, to a plurality of communication units in a two-way radio communication system, comprising:
   a dispatch control node that includes memory means for storing an identifier for each of at least some of the plurality of communication units;
   a packet relay center, comprising:
   a plurality of packet duplicators wherein a first of the plurality of packet duplicators is selected by the dispatch control node to duplicate the dispatch message to produce at least a first message replica; and
   combining means for combining a unique transaction number corresponding to the dispatch message with the at least a first message replica to produce a distributable information packet, wherein the unique transaction number uniquely identifies the dispatch message for later use by a target base station associated with at least a second of the plurality of communication units; and
   frame relay means, operably coupled between the packet relay center and the plurality of base stations, for distributing the distributable information packet.

16. The dispatch switching center of claim 15, wherein the frame relay means comprises at least one single channel, low speed, digital link.

* * * * *